(12) United States Patent
Cobb et al.

(10) Patent No.: US 8,416,296 B2
(45) Date of Patent: Apr. 9, 2013

(54) MAPPER COMPONENT FOR MULTIPLE ART NETWORKS IN A VIDEO ANALYSIS SYSTEM

(75) Inventors: Wesley Kenneth Cobb, The Woodlands, TX (US); Ming-Jung Seow, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 923 days.

(21) Appl. No.: 12/423,650

(22) Filed: Apr. 14, 2009

(65) Prior Publication Data

US 2010/0260376 A1    Oct. 14, 2010

(51) Int. Cl.
*H04N 7/18*    (2006.01)
(52) U.S. Cl.
USPC ........... 348/143; 348/149; 348/154; 348/155; 382/103; 382/291
(58) Field of Classification Search .......... 382/100, 382/103, 133, 158, 187, 190, 240, 275, 104; 382/291; 708/801; 706/12, 15, 20; 709/226; 348/135–145, 148, 154–155
See application file for complete search history.

(56) References Cited

U.S. PATENT DOCUMENTS

| | | | |
|---|---|---|---|
| 4,679,077 A | | 7/1987 | Yuasa et al. |
| 4,941,122 A | * | 7/1990 | Weideman .................... 708/801 |
| 5,058,180 A | * | 10/1991 | Khan ............................ 382/158 |
| 5,113,507 A | | 5/1992 | Jaeckel |
| 5,748,775 A | | 5/1998 | Tsuchikawa et al. |
| 5,751,378 A | | 5/1998 | Chen et al. |
| 5,835,633 A | * | 11/1998 | Fujisaki et al. ............... 382/187 |
| 5,835,901 A | * | 11/1998 | Duvoisin et al. ................ 706/19 |
| 5,969,755 A | | 10/1999 | Courtney |
| 6,252,974 B1 | | 6/2001 | Martens et al. |
| 6,263,088 B1 | | 7/2001 | Crabtree et al. |
| 6,421,467 B1 | * | 7/2002 | Mitra ............................ 382/240 |
| 6,456,991 B1 | * | 9/2002 | Srinivasa et al. ................ 706/20 |
| 6,570,608 B1 | | 5/2003 | Tserng |
| 6,661,918 B1 | | 12/2003 | Gordon et al. |
| 6,674,877 B1 | | 1/2004 | Jojic et al. |
| 6,678,413 B1 | | 1/2004 | Liang et al. |
| 6,856,249 B2 | | 2/2005 | Strubbe et al. |

(Continued)

FOREIGN PATENT DOCUMENTS

WO    2009049314 A2    4/2009

OTHER PUBLICATIONS

Harvey Et Al. "A Neural Network Architecture for General Image Recognition." MIT. 1991.*

(Continued)

*Primary Examiner* — Glenton B Burgess
*Assistant Examiner* — Michael Martinez
(74) *Attorney, Agent, or Firm* — Patterson & Sheridan LLP

(57) ABSTRACT

Techniques are disclosed for detecting the occurrence of unusual events in a sequence of video frames Importantly, what is determined as unusual need not be defined in advance, but can be determined over time by observing a stream of primitive events and a stream of context events. A mapper component may be configured to parse the event streams and supply input data sets to multiple adaptive resonance theory (ART) networks. Each individual ART network may generate clusters from the set of inputs data supplied to that ART network. Each cluster represents an observed statistical distribution of a particular thing or event being observed that ART network.

21 Claims, 11 Drawing Sheets

U.S. PATENT DOCUMENTS

| | | | |
|---|---|---|---|
| 6,940,998 | B2 | 9/2005 | Garoutte |
| 7,076,102 | B2 | 7/2006 | Lin et al. |
| 7,136,525 | B1 | 11/2006 | Toyama et al. |
| 7,158,680 | B2 | 1/2007 | Pace |
| 7,181,768 | B1* | 2/2007 | Ghosh et al. .................. 726/23 |
| 7,200,266 | B2 | 4/2007 | Ozer et al. |
| 7,227,893 | B1 | 6/2007 | Srinivasa et al. |
| 7,436,887 | B2 | 10/2008 | Yeredor et al. |
| 7,613,663 | B1* | 11/2009 | Commons et al. .............. 706/15 |
| 7,825,954 | B2 | 11/2010 | Zhang et al. |
| 7,868,912 | B2 | 1/2011 | Venetianer et al. |
| 2002/0186875 | A1* | 12/2002 | Burmer et al. ................. 382/133 |
| 2003/0037145 | A1* | 2/2003 | Fagan .......................... 709/226 |
| 2003/0107650 | A1 | 6/2003 | Colmenarez et al. |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0169529 | A1* | 8/2005 | Owechko et al. ............. 382/190 |
| 2005/0240629 | A1 | 10/2005 | Gu et al. |
| 2005/0265629 | A1* | 12/2005 | Fu et al. ........................ 382/275 |
| 2006/0018516 | A1 | 1/2006 | Masoud et al. |
| 2006/0165386 | A1 | 7/2006 | Garoutte |
| 2006/0190419 | A1 | 8/2006 | Bunn et al. |
| 2006/0222206 | A1 | 10/2006 | Garoutte |
| 2008/0002856 | A1 | 1/2008 | Ma et al. |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0252723 | A1 | 10/2008 | Park |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0036780 | A1* | 2/2010 | Angelov ........................ 706/12 |
| 2010/0063949 | A1 | 3/2010 | Eaton et al. |
| 2011/0051992 | A1* | 3/2011 | Cobb et al. ................... 382/100 |
| 2011/0052000 | A1* | 3/2011 | Cobb et al. ................... 382/103 |

OTHER PUBLICATIONS

Carpenter, G.A.; Grossberg, S.; Reynolds, J.H.; , "ARTMAP: supervised real-time learning and classification of nonstationary data by a self-organizing neural network," Neural Networks, 1991.*

Carpenter, G.A.; Grossberg, S.; Markuzon, N.; Reynolds, J.H.; Rosen, D.B.; , "Fuzzy ARTMAP: an adaptive resonance architecture for incremental learning of analog maps," Neural Networks, 1992. IJCNN., International Joint Conference on , vol. 3, No., pp. 309-314 vol. 3, Jun. 7-11, 1992.*

Vlajic, N.; Card, H.C.; , "Vector quantization of images using modified adaptive resonance algorithm for hierarchical clustering," Neural Networks, IEEE Transactions on , vol. 12, No. 5, pp. 1147-1162, Sep. 2001.*

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), Jun. 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, Jun. 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

MAPPER COMPONENT FOR MULTIPLE ART NETWORKS IN A VIDEO ANALYSIS SYSTEM

BACKGROUND OF THE INVENTION

1. Field of the Invention

Embodiments of the invention provide techniques for computationally analyzing a sequence of video frames. More specifically, embodiments of the invention relate to techniques for a mapper component to analyze the sequence of video frames using multiple adaptive resonance theory (ART) networks.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" or "abnormal" behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

Further, the static patterns recognized by available video surveillance systems are frequently either under inclusive (i.e., the pattern is too specific to recognize many instances of a given object or behavior) or over inclusive (i.e., the pattern is general enough to trigger many false positives). In some cases, the sensitivity of may be adjusted to help improve the recognition process, however, this approach fundamentally relies on the ability of the system to recognize predefined patterns for objects and behavior. As a result, by restricting the range of objects that a system may recognize using a predefined set of patterns, many available video surveillance systems have been of limited (on simply highly specialized) usefulness.

SUMMARY OF THE INVENTION

Embodiments of the invention relate to techniques for a mapper component to analyze the sequence of video frames using multiple adaptive resonance theory (ART) networks.

One embodiment of the invention includes a computer-implemented method for analyzing a sequence of video frames depicting a scene captured by a video camera. The method may generally include receiving one or more data streams generated from the sequence of video frames and parsing the data streams to identify data inputs matching an input layer of one of a plurality of adaptive resonance theory (ART) networks. Each ART network is configured to generate clusters from the data inputs matching the input layer of a respective ART network. And each cluster may provide a statistical distribution of a characteristic of the scene derived from the data streams that has been observed to occur at a location in the scene corresponding to a location of the cluster. The method may also include passing the data inputs to the ART network with the matching input layer, updating the generated clusters in the ART network with the matching input layer, and evaluating the clusters of the ART network with the matching input layer to determine whether the data inputs passed to the ART network are indicative of an occurrence of a statistically relevant event, relative to the clusters in the ART network with the matching input layer.

In a particular embodiment, the method may further include publishing an alert message in response to determining that the data inputs passed to the ART network are indicative of the occurrence of the statistically relevant event. For example, the statistically relevant event may comprise is one of the creation of a new cluster in response to passing the data inputs to the ART network with the matching input layer and a mapping, by the ART network with the matching input layer, of the data inputs to a cluster of low significance, relative to other clusters in the ART network.

Another embodiment of the invention includes a computer-readable storage medium containing a program which, when executed by a processor, performs an operation for analyzing a sequence of video frames depicting a scene captured by a video camera. The operation may generally include receiving one or more data streams generated from the sequence of video frames and parsing the data streams to identify data inputs matching an input layer of one of a plurality of adaptive resonance theory (ART) networks. Each ART network may be configured to generate clusters from the data inputs matching the input layer of a respective ART network. And each cluster may provide a statistical distribution of a characteristic of the scene derived from the data streams that has been observed to occur at a location in the scene corresponding to a location of the cluster. The operation may further passing the data inputs to the ART network with the matching input layer, updating the generated clusters in the ART network with the matching input layer, and evaluating the clusters of the ART network with the matching input layer to determine whether the data inputs passed to the ART network are indicative of an occurrence of a statistically relevant event, relative to the clusters in the ART network with the matching input layer.

Still another embodiment includes a system having a video input source configured to provide a sequence of video frames, each depicting a scene. The system may also include processor and a memory containing a program, which, when executed on the processor is configured to perform an operation for analyzing the scene, as depicted by the sequence of video frames captured by the video input source. The operation may generally include receiving one or more data streams generated from the sequence of video frames and parsing the data streams to identify data inputs matching an input layer of one of a plurality of adaptive resonance theory (ART) networks. Each ART network may be configured to generate clusters from the data inputs matching the input layer of a respective ART network. And each cluster may provide a statistical distribution of a characteristic of the scene derived from the data streams that has been observed to occur at a location in the scene corresponding to a location of the cluster. The operation may further passing the data inputs to the ART network with the matching input layer, updating the generated clusters in the ART network with the matching input layer, and evaluating the clusters of the ART network with the matching input layer to determine whether the data inputs passed to the ART network are indicative of an occurrence of a statistically relevant event, relative to the clusters in the ART network with the matching input layer.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
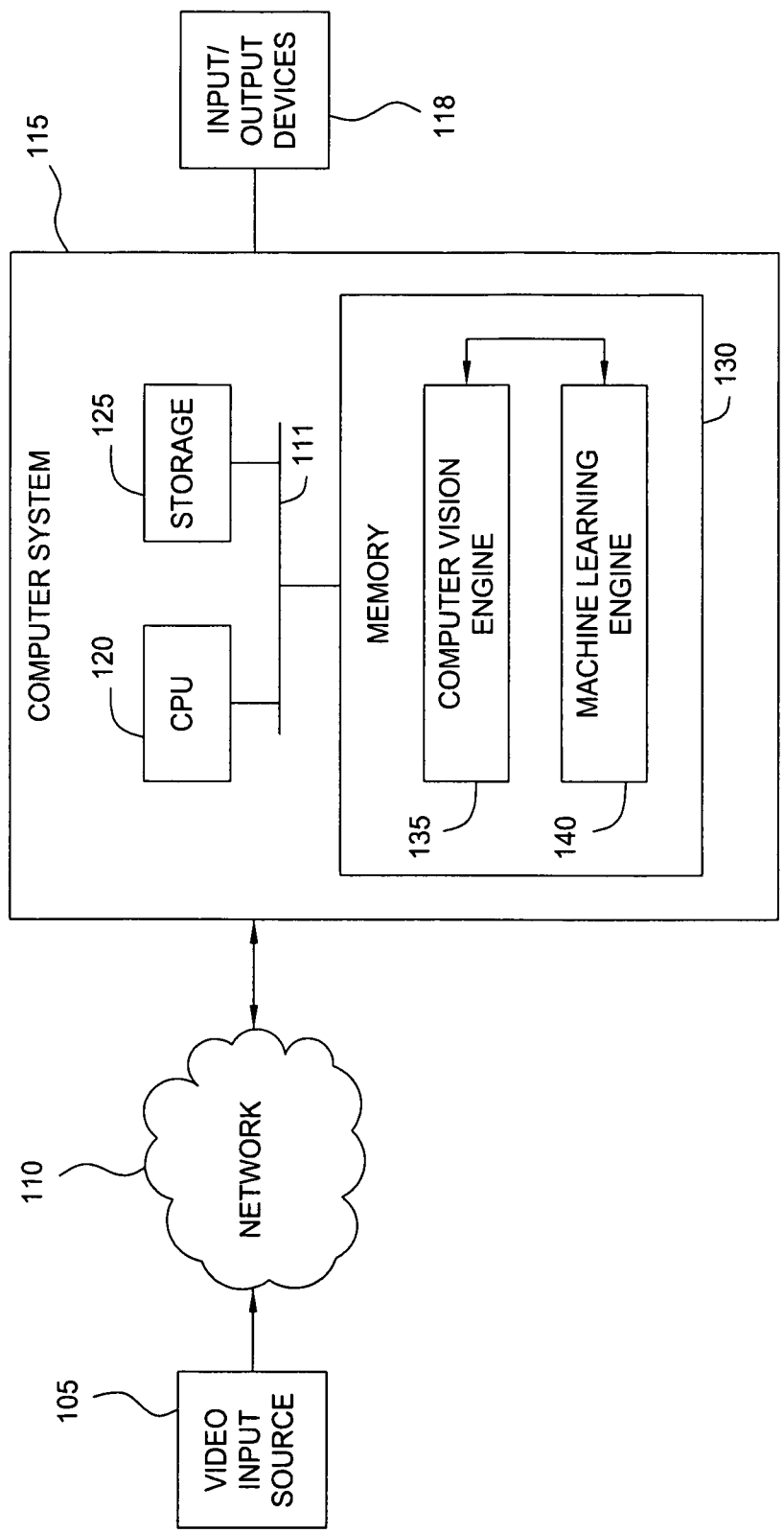
FIG. 1 illustrates components of a video analysis system, according to one embodiment of the invention.

Embodiments of the invention provide a behavior-recognition system which may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to receive and evaluate a stream of video frames. Each frame may include data representing the color, grayscale, and/or intensity values for each pixel in the frame. A frame of video may be characterized using multiple color channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a region of the scene (referred to as a "blob" or "patch") is observed with appearance values that differ substantially from the background image, that region is identified as depicting a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames.

Data output from the computer vision engine may be supplied to the machine learning engine. In one embodiment, the machine learning engine may evaluate the context events to generate "primitive events" describing object behavior. Each primitive event may provide some semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories representing a higher-level abstraction of a car parking in the scene—generated from the primitive events underlying the higher-level abstraction. Further still, patterns representing an event of interest may result in alerts passed to users of the behavioral recognition system.

In one embodiment, the machine learning engine may include a mapper component configured to parse data coming from the context event stream and the primitive event stream and to supply portions of these streams as input to multiple Adaptive Resonance Theory (ART) networks. Each individual ART network may generate clusters from the set of inputs data specified for that ART network. Each cluster represents an observed statistical distribution of a particular thing or event being observed that ART network. Further, the mapper component may be configured to detect unusual events occurring in the scene depicted by the video frames. For example, the mapper component may monitor the clusters that emerge in a given one of the ART networks, and in some cases, when a set of inputs results in a new cluster, generate an alert representing the occurrence of an unusual event. In one embodiment, the ART network may be configured to provide dynamic clustering. That is, unlike ART networks known in the art, a cluster in the modified ART network described herein may change in size as each set of input data is mapped to that cluster. As described in greater detail below, a cluster may initially be defined as a relatively small size (e.g., an area corresponding to a radius of 5-10 pixels). However, as inputs are mapped to that cluster, the size may grow and change over time. Further, the clusters may decay over time. For example, if a cluster does not receive a set of input data (reinforcing the importance of that cluster) for a specified period of time, such a cluster may be removed from an ART network.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn and remember details regarding events (and types of events) that transpire within the scene over time.

In one embodiment, the machine learning engine 140 receives the video frames and the data generated by the computer vision engine 135. The machine learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
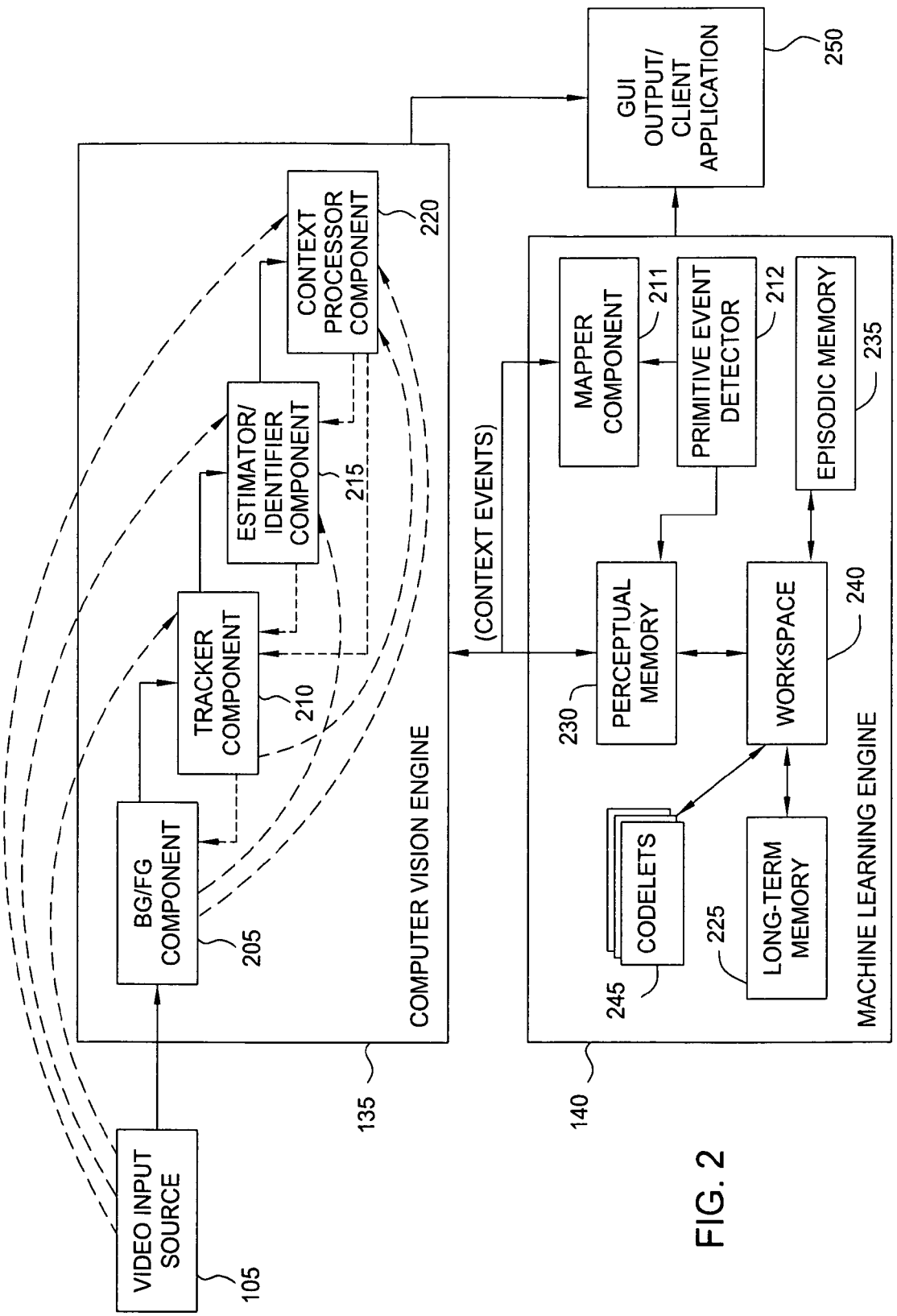
FIG. 2 further illustrates components of the video analysis system shown in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict foreground and, conversely, which pixels have been determined to depict scene background. The BG/FG component 205 then identifies regions of the scene that contain a portion of scene foreground (referred to as a foreground "blob" or "patch") and supplies this information to subsequent stages of the pipeline. Additionally, portions of the scene determined to depict scene background maybe used to update pixel values in a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

Further, as described in greater detail below, the mapper component 211 may receive the context event stream and the primitive event stream and parse information to multiple ART networks to generate statistical models of what occurs in the scene for different groups of context events and primitive events.

Generally, the workspace 240 provides a computational engine for the machine learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine learning engine 140 performs a cognitive cycle used to observe, and learn, about patterns of behavior that occur within the scene.

Figure 3:
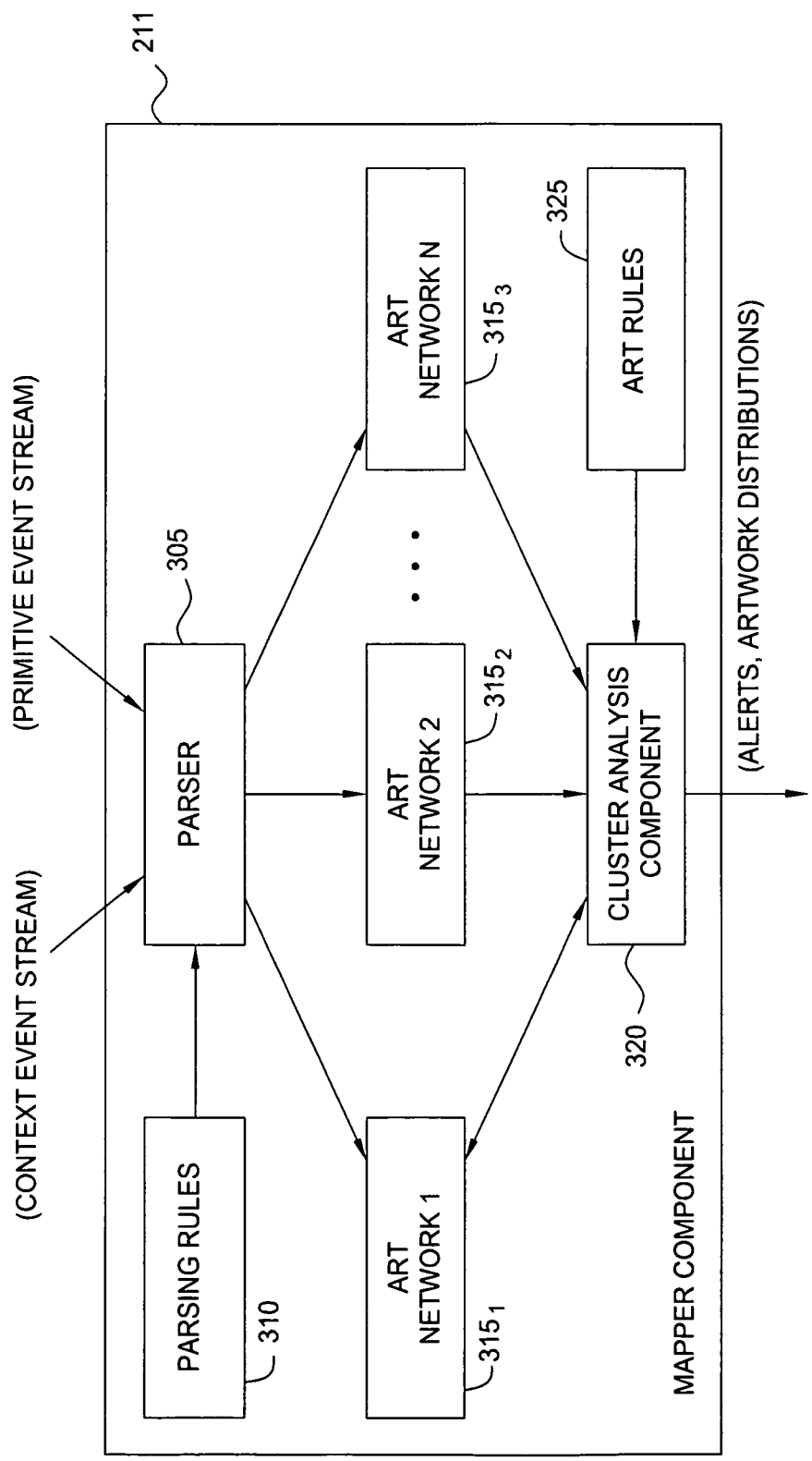
FIG. 3 illustrates an example of a mapper component of the video analysis system shown in FIG. 2, according to one embodiment of the invention.

FIG. 3 illustrates an example of the mapper component 211 of the video analysis system shown in FIG. 2, according to one embodiment of the invention. As stated, the mapper component 211 may be configured to parse the context and primitive event streams and to provide information parsed from these streams to multiple ART networks 315. An ART network provides a specialized neural network configured to create clusters from a group of inputs. Each cluster itself may be characterized by a mean and a variance from a prototype input representing that cluster. The prototype is generated first, as a copy of the input vector used to create a new cluster. Subsequently, the prototype may be updated as new inputs are mapped to that cluster. Additionally, a cluster may be characterized by how many input vectors have been used to update that cluster—after it is initially created. Typically, the more input vectors that map to a given cluster, the more significant that cluster.

For example, an ART network may receive a vector as input and either update an existing cluster or create a new cluster, as determined using a choice test and a vigilance test for an the ART network. The vector may provide group of attributes related to a foreground object, e.g., for object classified as a person located in a frame of video at a position of (x, y) and having a height (h) and width (w) (in pixels). The choice and vigilance tests are used to evaluate the vector passed to the ART network. The choice test provides a ranking of the existing clusters, relative to the vector input data. Once ranked, the vigilance test evaluates the existing clusters to determine whether to map the input to a given cluster. If no cluster is found to update using the data supplied to the input layer, evaluated sequentially using the ranked clusters, then a new cluster is created. That is, once a pattern is found (i.e., the input "matches" an existing cluster according to the choice and vigilance tests), the prototype for that cluster is updated based on the values of the input vector. Otherwise, if the input vector does not match any available cluster (using the vigilance test), a new cluster is created by storing a new pattern similar to the input vector. Subsequent input vectors that most closely resemble the new cluster (relative to the others) are then used to update that cluster.

As is known, the vigilance parameter has considerable influence on an ART network: higher vigilance produces many, fine-grained clusters, where a while lower vigilance results in more general more-general clusters. Further, the inputs may be a binary values (generally referred to as an ART1 network), or may be continuous values (generally referred to as an ART2 network). Other variations of the ART network include ART3, ARTMAP, and FUZZY ART networks.

In one embodiment, the ART networks 315 may be configured to provide dynamic cluster sizes. For example, each cluster may be given an initial shape and size, such as a radius of 5-10. Each new input to a given ART network is then used to update the size of a cluster for each dimension of input data (or create a new cluster). Consider, e.g., an ART network 315 which is mapped input vectors which include (x, y, h, w) representing a position (x, y) of an object in a frame of video (e.g., a foreground object classified as a person) having a height (h) and width (w) (in pixels). This example results in clusters in a 4 dimensional space—a hyper-ellipsoid. In such a case, clusters may be defined using a mean and variance for a cluster in each of the four dimensions. As new input vectors are mapped the cluster, the mean and variance for each dimension may be updated, changing the position, shape and size of the cluster. Alternatively, the clusters may be defined using a mean and a covariance. Doing so results in a more accurate boundary for each cluster. However, using a covariance approach increases the computational complexity. Thus, the actual approach may be tailored to suit the needs of a particular case. Further, by projecting the cluster into a two-dimensional plane (x, y), the resulting shape and position of the cluster correspond to a region in the scene where the events being categorized by the ART network have been observed. Thus, for an ART network categorizing the position (and pixel width and height) of a person, each cluster identifies an area in the scene where people have, e.g., appeared, disappeared, or simply been observed to be present.

Additionally, in one embodiment, the ART networks 315 may also be configured to provide for cluster decay. For example, each ART network 315 may be configured to require that a cluster be periodically reinforced in order to remain in a given ART network. In such a case, if a new cluster is created, but no new inputs have been mapped to that cluster for a specified period, then that ART network may simply remove the cluster. Doing so improves the efficiency of the ART network by not retaining clusters of little (or no) significance. Further, doing so helps to account for the reality that the events observed in a scene are expected to change over time. That is, while a cluster may be significant at one time (e.g., because people are repeatedly observed to appear at a first location), the patterns of behavior being observed may change (e.g., people being observed to appear at a second location).

Further, the ART networks 315 may be also be configured to identify the relative significance of the clusters in a given ART network. For example, an ART network 315 may maintain a count of how many input vectors have been used to update each cluster.

In one embodiment, the parsing rules 310 specify what groups of context and/or primitive events are provided as inputs to a given ART network 315. That is, the parsing rules 310 specify what aspects of the scene, as reflected in the context and primitive events, a given ART network 315 should categorize. For example, some of the ART networks 315 may be used to generate statistical distributions categorizing "who" or "what" occurs "where" in a given scene, along with a characteristic of the "who" or "what" being categorized. That is, for a given class of foreground objects (e.g., people), one of the ART networks 315 may categorize where objects of this class are observed, as well as the kinematic properties (as reflected in the context events) for objects of the given class. For example, continuing with objects classified as depicting a person, the inputs to one of the ART networks 315 may be the height, width, and XY position (all in pixels) of each distinct foreground object. Similarly, some of the ART networks 315 may be used to categorize "who" at "where" is doing "what" in the scene. That is, to create a distribution of where in the scene certain objects are likely to be present or where certain primitive events are observed to occur.

As stated, the parsing rules 310 identify what information should be passed to each respective ART network 315. For example a parsing rule 310 may identity a subject type (i.e., a classification assigned to an estimator/identifier component 215), a primitive event type(s), and context event type(s) the particular ART network 315 listens to. For example, assume that the estimator identifier component 215 is configured to classify foreground objects as being a "person," a "vehicle," an "unknown," or an "other," as discussed above. In such a case, for objects classified as depicting a "person," the context and primitive event streams could be parsed to create the following ART networks:

TABLE I

Parsing rules for Person objects person, pos-X pos-Y, appears
person, pos-X pos-Y, disappears
person, pos-X pos-Y, height, width
person, pos-X pos-Y, velocity-X, velocity-Y
person, pos-X pos-Y, acceleration-X, Acceleration-Y Parsing rules 310 could also be defined to create similar ART networks for each of the "vehicle," "unknown" and/or "other" classes. Of course, as the estimator/identifier component 215 is configured to make other classifications, additional ART networks 315 could be created to categorize other sets of context events and/or primitive events. Similarly, as the machine learning engine 140 is configured to recognize additional primitive events, or the computer vision engine is configured to generate additional context events, for the existing object classifications, additional ART networks 315 could be used to categorize a broad variety of information derived from a sequence of video. Also similarly, ART networks 315 could be created as combinations of classifications, e.g., each of the "person," "vehicle," "unknown," and/or "other" classes could be supplied to an ART network configured to categorize a generic "position" or "appear" distribution for all foreground objects, regardless of the classification type assigned to any given object.

As clusters emerge in the ART networks 315, a cluster analysis component 320 may be configured to evaluate the ART networks 315 to determine whether an unusual event has occurred, based on a set of alert rules 325. For example, consider the scenario of an ART network 315 configured to categorize objects of the "person" class, based on the position at which a person appears (or disappears) from the scene. In such a case, each cluster describes a prototypical position of where a person may appear—and a mean and variance from that prototypical position (e.g., to 2.5 standard deviations in the X and Y directions). In this scenario, one of the alert rules 325 may specify that whenever this ART network 315 generates a new cluster based on a set of parsed input values, an alert should be generated. Further, as the decision of the ART network 315 to create a new cluster is dependent on whether a given input sufficiently resembles one of the current clusters, in one embodiment, the ART network 315 is allowed to "cool" for specified period of time prior to any alerts being generated. That is, until the computer vision engine 135 has observed a sufficient number of persons, new clusters may be created with a relatively high frequency. Conversely, after prolonged observation, the relative frequency of new clusters should decline—making the event of a new cluster more unusual. Of course, one of skill in the art that the alert rules may be based on a broad variety of triggering conditions based on the state of one of the ART networks 315- and that the actual alert rules may be tailored for a given ART network 315 and by the needs of a particular case.

As stated, clusters of a given ART network 315 may dynamically expand and contract by learning—as the mean and variance from the prototypical cluster value changes based on inputs to that ART network 315. Further, multiple clusters may collapse to a single cluster when they overlap by a specified amount (e.g., the two clusters share greater than a specified percentage of their area). In such a case, the mean and variance of each cluster contributes to the mean and variance of the merged cluster. Additionally, the statistical significance of each cluster participating in the merger may contribute to a significance determined for the merged cluster. Also as stated, each ART network 315 may track how many inputs to a given ART network 315 are mapped to a particular cluster in that ART network 315. Typically, the more inputs that map to a cluster, the greater the relative significance of that cluster. In one embodiment, the relative importance of a given cluster may contribute to the determination of whether to generate an alert (according to the alert rules 325) when a new cluster is created (or otherwise). For example, if a given ART network 315 has many clusters, all of relatively equal significance, then the creation of a new cluster may be a relatively minor event. Conversely, if a given ART network 315 has a small number of clusters of disproportionate significance (relative to other clusters in that ART network 315) then the creation of a new cluster may be a much more unusual event.

Figure 4:
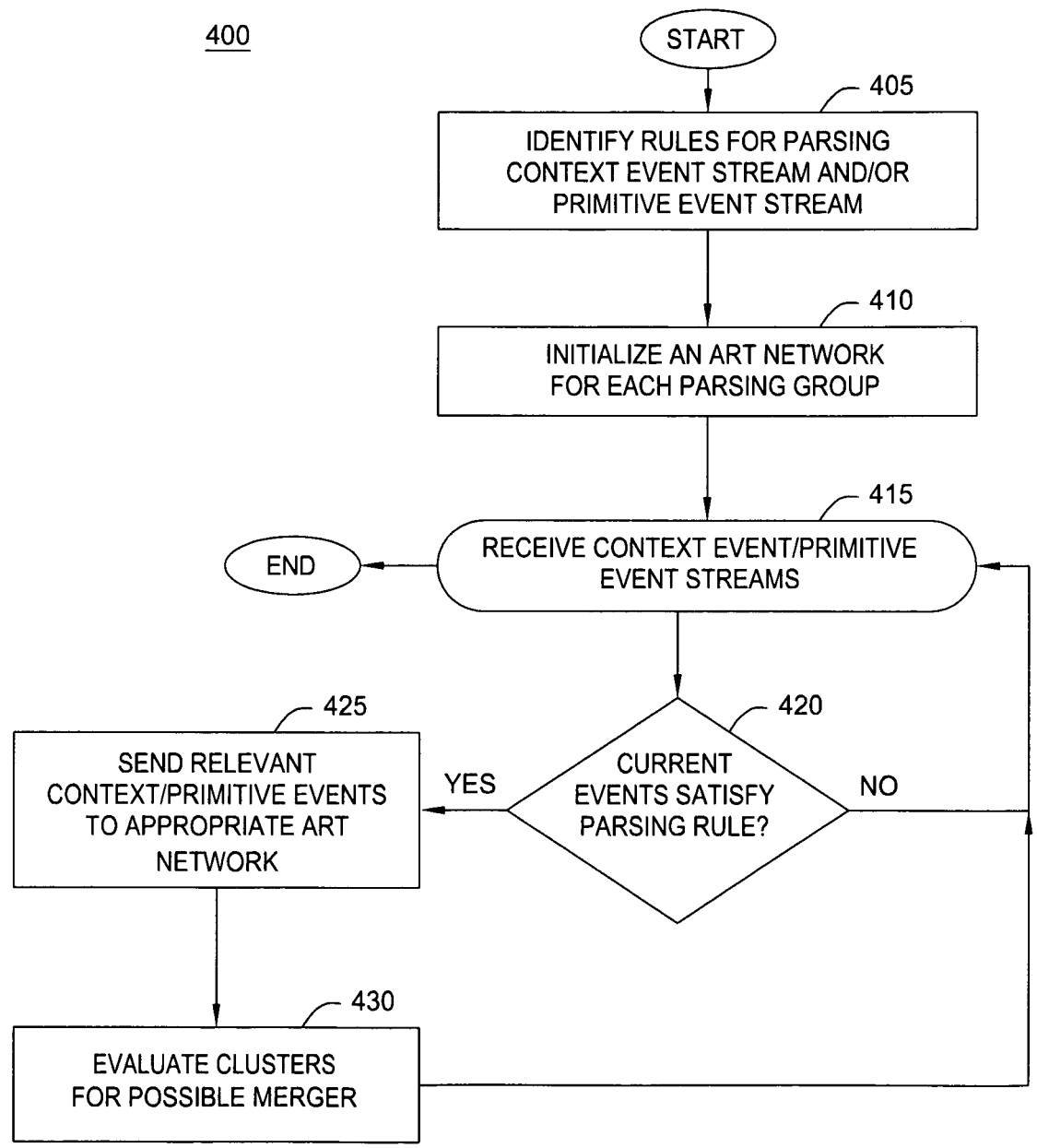
FIG. 4 illustrates a method for parsing data streams to generate inputs for multiple ART networks, according to one embodiment of the invention

FIG. 4 illustrates a method 400 for parsing data streams to generate inputs for multiple ART networks, according to one embodiment of the invention. As shown, the method 500 begins at step 405 where the mapper component identifies rules for parsing a context events and/or a primitive event stream. As described, each rule may specify a subject type, primitive event type, what variables are used as input to an ART network, etc (e.g., width, position, velocity, angle, etc). Once identified, the mapper component may initialize an ART network for each group of inputs specified by the parsing rules. Once initialized, at step 415, the mapper component 211 begins monitoring the context event stream generated by the computer vision engine 135 and the primitive event stream generated by the primitive event detector 212. At step 420, the mapper determines whether a complete set of inputs have been received for one (or more) of the ART networks. That is, the mapper component parses the context event and primitive event streams to identify instances of an input data group. Each input data group corresponds to the input layer of a distinct ART network. If so, at step 425, the mapper component sends the relevant context event/primitive event data to the appropriate ART network. As described above, the ART network may respond by mapping the inputs to an existing cluster—and using the inputs to further train (refine) that cluster, or create a new cluster. Once complete, at step 430, the mapper component may evaluate the clusters in the ART network that processed the inputs at step 425 for a possible merger. As noted above, multiple clusters may be merged when they overlap by a specified amount.

Figure 5:
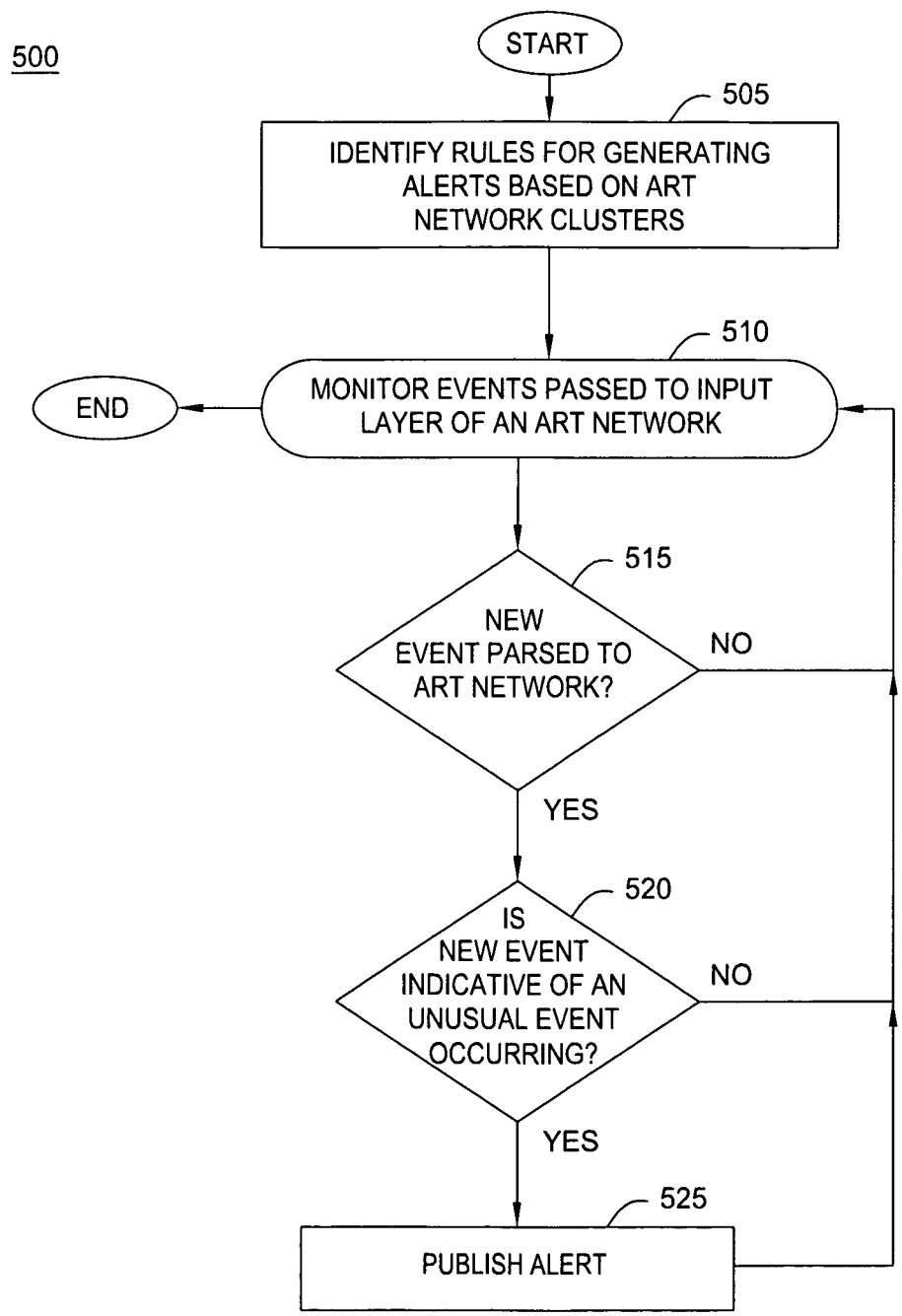
FIG. 5 illustrates a method for identifying occurrences of unusual behavior based on past observations of a scene, according to one embodiment of the invention.

FIG. 5 illustrates a method 500 for identifying occurrences of unusual behavior, based on past observations of a scene, according to one embodiment of the invention. As shown, the method 500 begins at step 505 where the mapper component 211 identifies rules for generating alerts, based on the state of clusters in the ART networks 315. At step 510, once the mapper component begins parsing the primitive and context event streams for inputs to the ART networks, the cluster analysis component 320 may be configured to monitor for a set of inputs being passed to an input layer of one of the ART networks. At step 515, the cluster analysis component 320 may determine whether a new event has been parsed to one of the ART networks. If not, the method returns to step 510 where the cluster analysis component 320 continues to wait for a set of inputs to be passed to one of the ART networks. Otherwise, after a set of inputs is passed to one of the ART networks, the cluster analysis component 320 may evaluate the resulting change in that ART network to determine whether the an unusual event has occurred (step 520). For example, as described above, in some cases, the creation of a new cluster in the ART network may be indicative of an unusual event in the scene, e.g., the appearance of a person in the video at a highly unusual location—relative to the locations where individuals have previously been observed to appear in the scene. If so, at step 515, an alert may be published. In one embodiment, e.g., the alert may be presented on a graphical display device provided for a user of the behavior-recognition system 100

Figure 6:
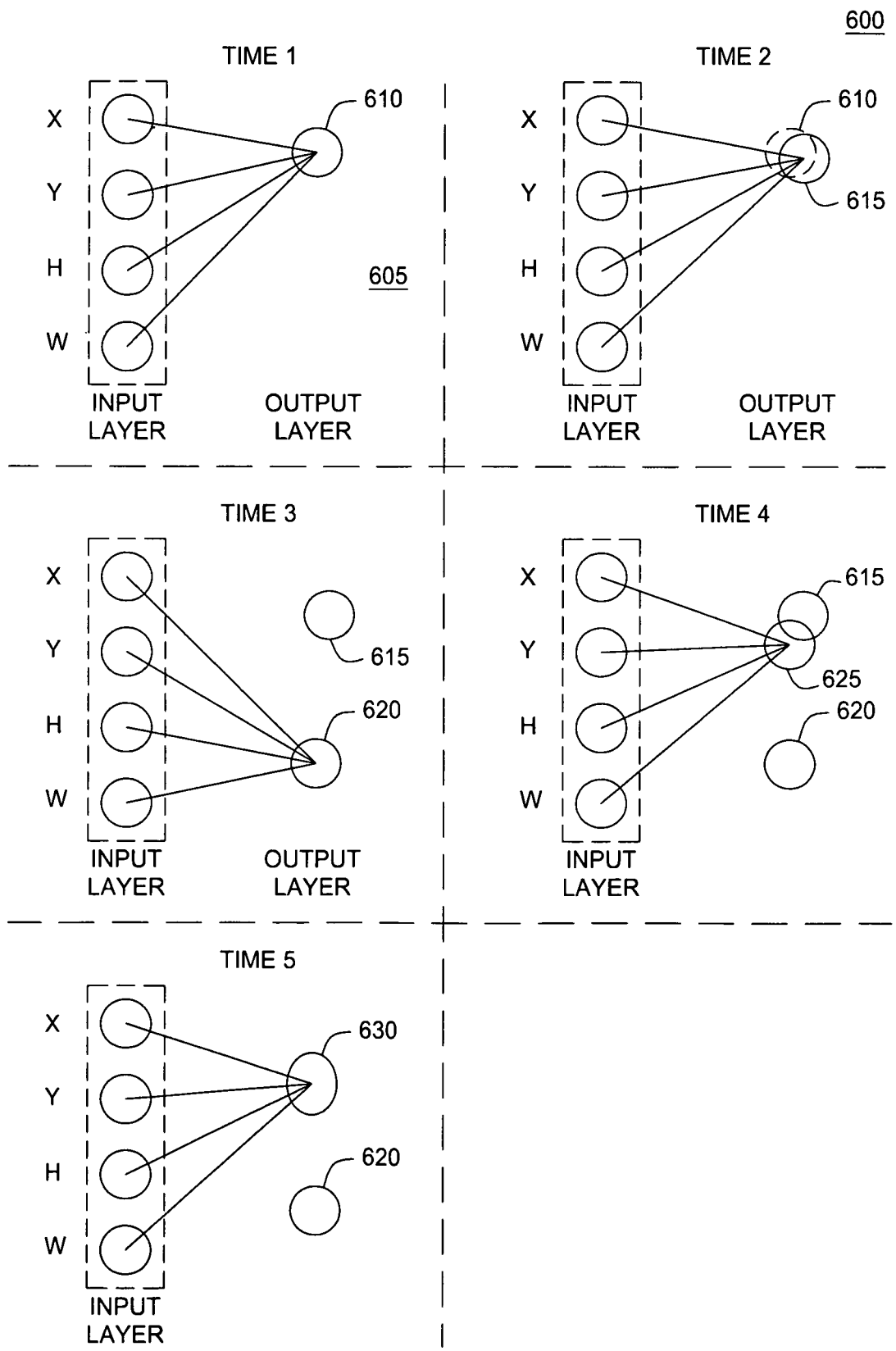
FIG. 6 illustrates a graphical representation of clusters in an ART network generated from video analysis data, according to one embodiment of the invention.

FIG. 6 illustrates a graphical representation of clusters in an ART network generated from video analysis data, according to one embodiment of the invention. In this example, assume the inputs represent the coordinate X, Y positions in a frame of video at which a person is observed, as well as the height and width of that person (in pixels). As shown, at time 1, a set of inputs maps to an initial cluster 610 in ART network 605. In this case, cluster 610 represents a prototypical position (and height and width of a person at that position) in this ART network. Initially, the prototypical position may simply be the first set of inputs supplied to the input layer. Thereafter, each time a set of input data is used to update the cluster 610, a mean and variance maintained for the cluster (for each dimension of input data) are updated based on the input data.

Subsequently, at time 2, a second set of input data is supplied to this ART network. Illustratively, the inputs map to the cluster 610, within the limits defined by the variance and choice variable specified for this ART network. Accordingly, the cluster 610 is trained using the set of inputs supplied at time 2, resulting in a cluster 615, at a slightly different position, i.e., a new mean is generated. Conversely, at time 3, a third set of input data is parsed to this ART network. However, the input data results in the creation of a new cluster 620.

At time 4, a set of input data is supplied to the input layer that results in a cluster 625 overlapping with cluster 615. In such a case, as additional input data sets are supplied to this ART network, clusters 615 and 625 may drift closer together—to the point that they overlap by an amount greater than a target percentage of their areas. A target percentage of fifty percent has proven to be effective in some cases. When two clusters overlap by an amount that exceeds the target percentage, the overlapping clusters may be merged. Doing so may help keep the number of distinct clusters managed by the ART network and evaluated by the cluster analysis tool manageable. The results of the merger are shown at time 5, where cluster 630 has an elliptical shape derived form clusters 615 and 625. For example, as noted above, each cluster may have a mean and a variance in each of the X and Y directions. In such a case the mean and variance from cluster 615 and cluster 625 (at time 4) may be used to create a merged cluster 630 shown at time 5.

Figure 7:
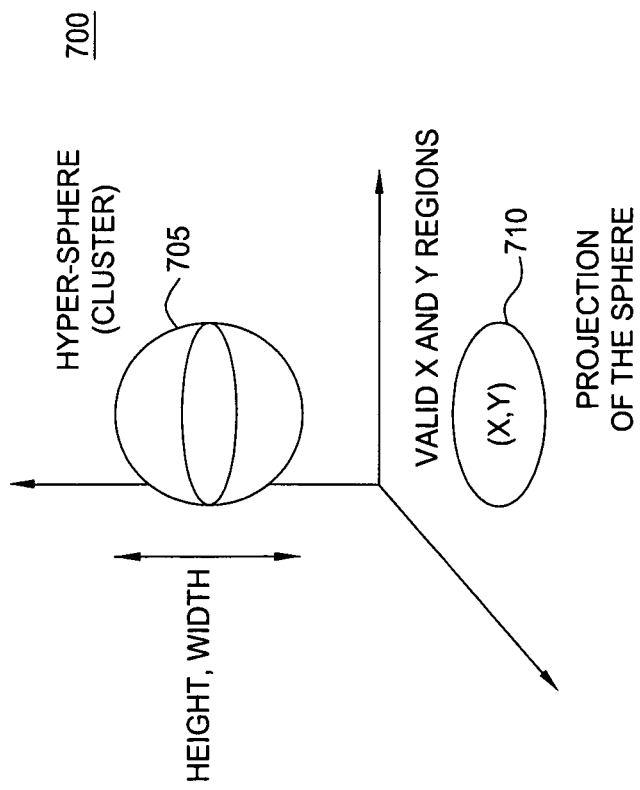
FIG. 7 illustrates a graphical representation of a cluster generated by an ART network and a two-dimensional (2D) projection of the cluster, according to one embodiment of the invention.

FIG. 7 illustrates a graph 700 showing a cluster 705 generated by an ART network and a two-dimensional (2D) projection 710 of the cluster 705, according to one embodiment of the invention. In this example, the cluster 705 is represented as a hyper-sphere (i.e., a sphere in n dimensions) generated from input data regarding foreground objects classified as "persons." In particular, the hyper-sphere has four dimensions, an X, Y position of the person and a height and width of the person (in pixels). The center of the hyper-sphere provides a prototypical position, height and width a person in the scene, based on observations made over time. In one embodiment, the hyper-sphere is defined by the mean and variance from the prototypical person represented by cluster 705 calculated from the input data mapped to cluster 705. For example, the boundary may represent a distance of 2.5 standard deviations away from the mean for one of the input layer dimensions. Each new set of input data mapping to cluster 705 is used to train (refine) the prototype (X, Y) position, height, and width represented by the cluster 705. Additionally, graph 700 shows the cluster 705 projected into the (X, Y) plane. The projection 710 represents a region of the scene where objects represented by the cluster (e.g., foreground objects classified as depicting persons) have been observed to appear, up to 2.5 standard deviations from the prototypical position. Accordingly, when persons appear in another region of the scene (i.e., outside of the projection 710), it may represent the occurrence of an unusual event, resulting in the generation of an alert by the cluster analysis tool 320.

Figure 8:
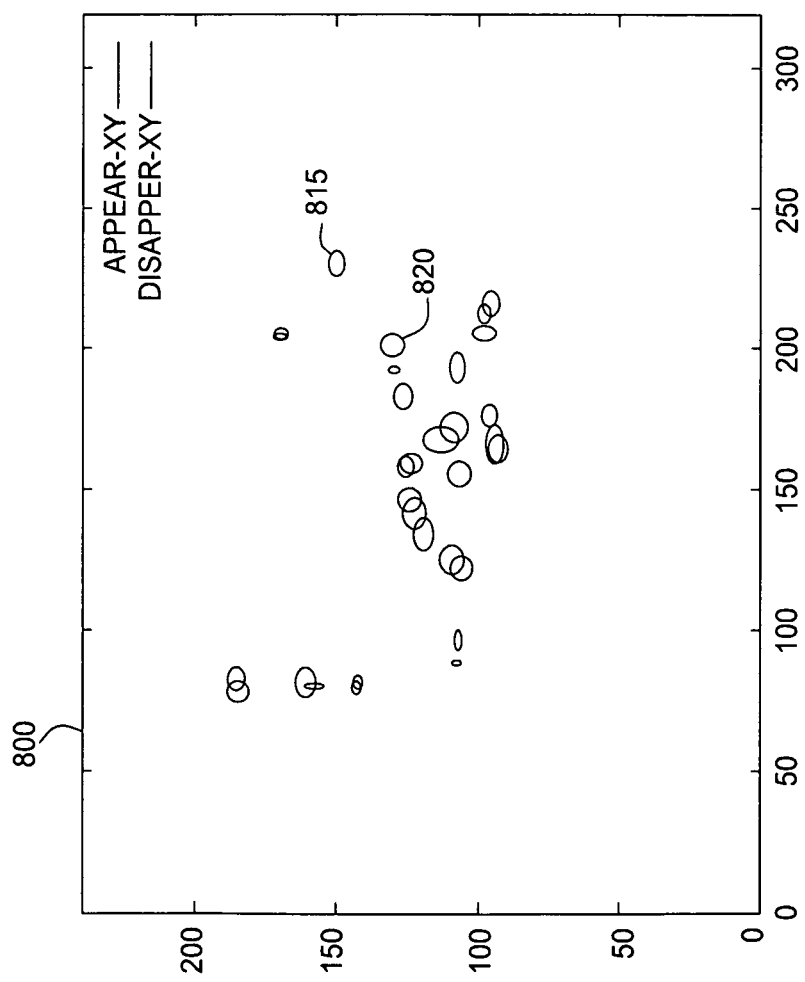
FIG. 8 illustrates an example of multiple clusters generated by three independent ART networks, according to one embodiment of the invention, according to one embodiment of the invention.

FIG. 8 illustrates an example of a set of clusters generated by two independent ART networks, according to one embodiment of the invention, according to one embodiment of the invention. In this particular example, the clusters represent the (X, Y) position in a scene where objects have been observed to appear (represented by the solid clusters, e.g., cluster 815) or disappear (represented by the dashed clusters, e.g., cluster 820). Additionally, the objects are not limited to a particular classification type (e.g., foreground objects classified by the computer vision engine 135 as depicting a "person" or a "vehicle", instead, the clusters represent a position in the video where any classified object is observed to appear or disappear.

Figure 9A:
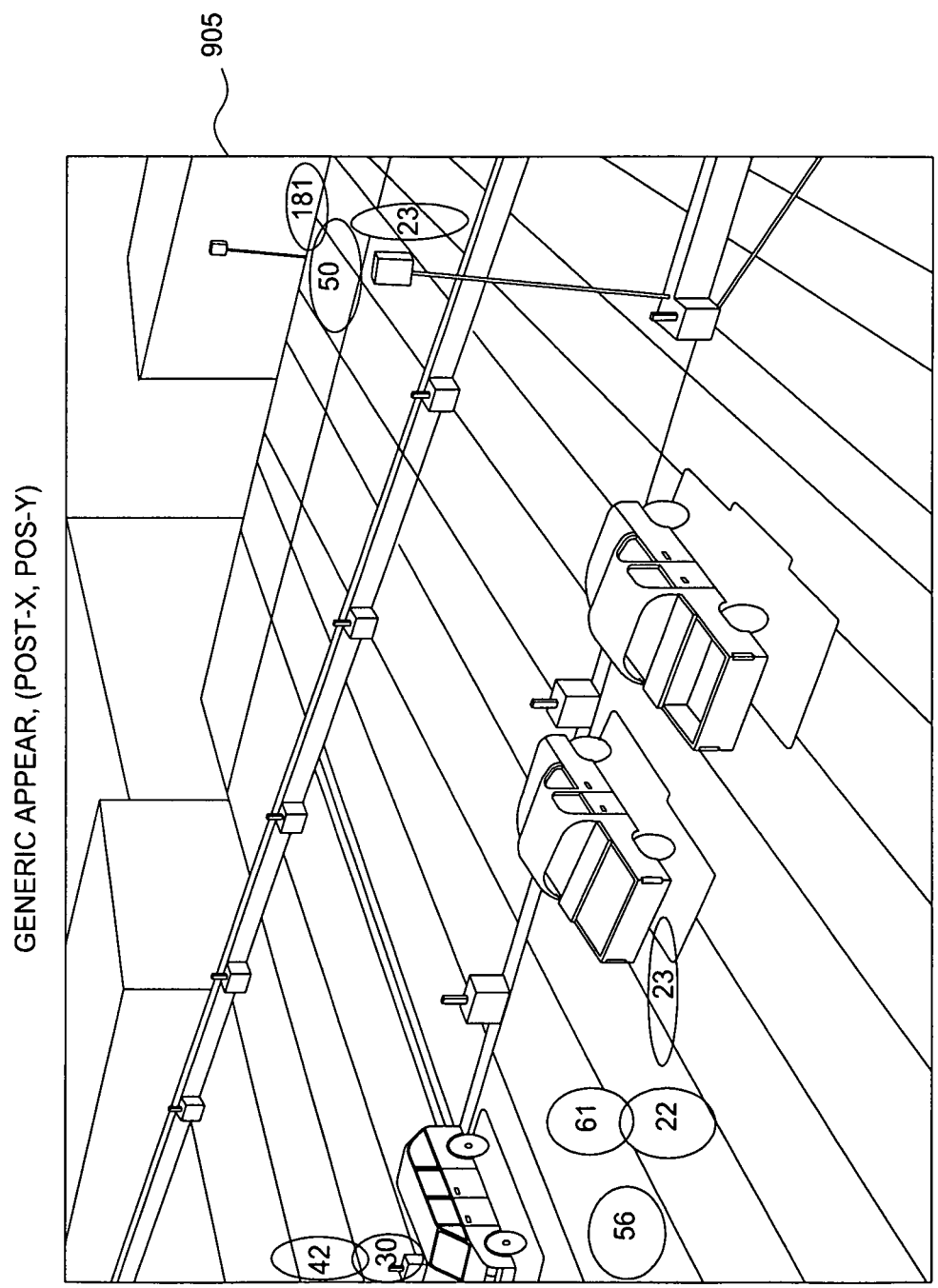
FIGS. 9A-9C illustrate examples of clusters generated by different ART networks superimposed over the background model of a scene, according to one embodiment of the invention.
Figure 9B:
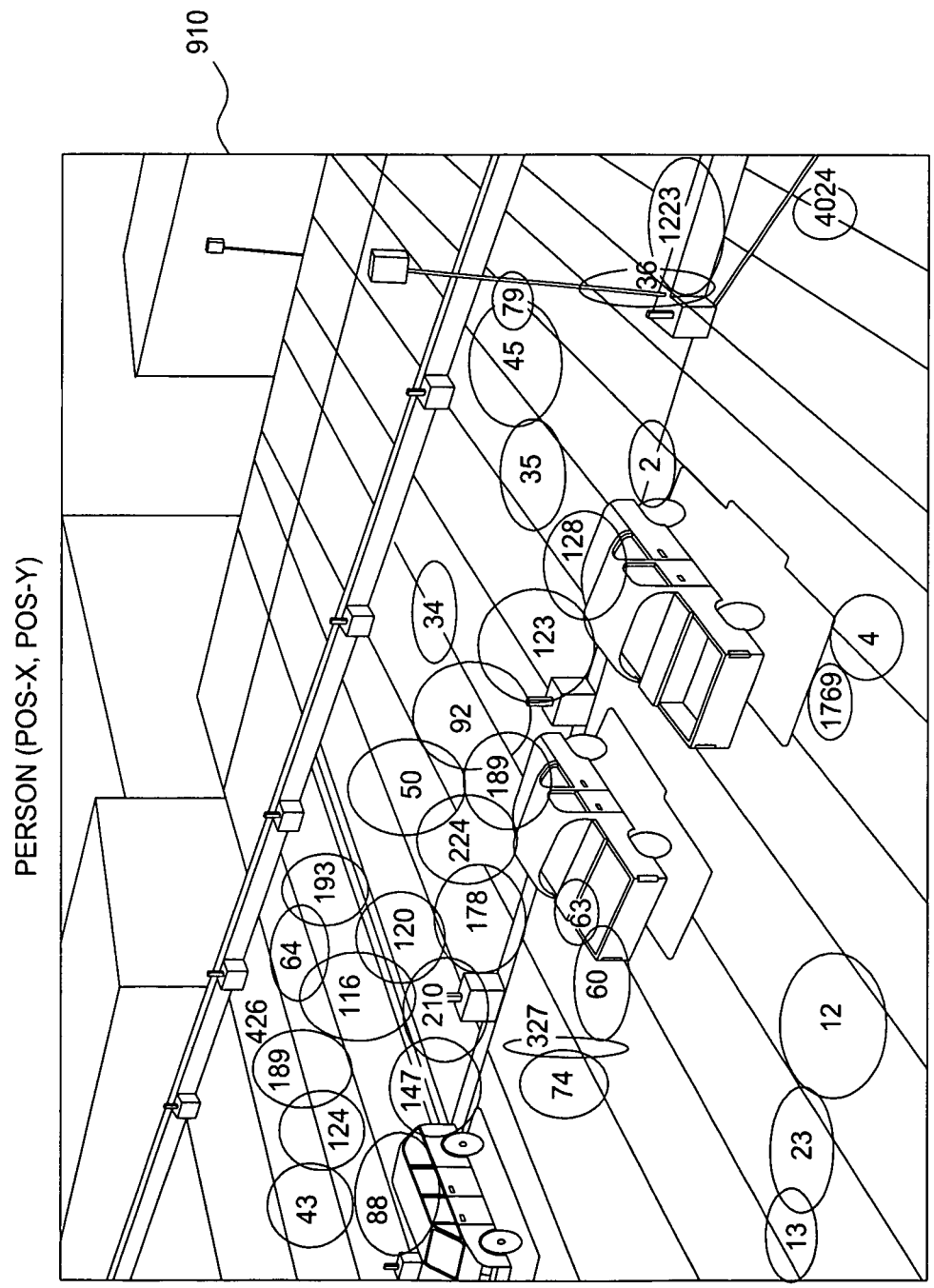
Figure 9C:
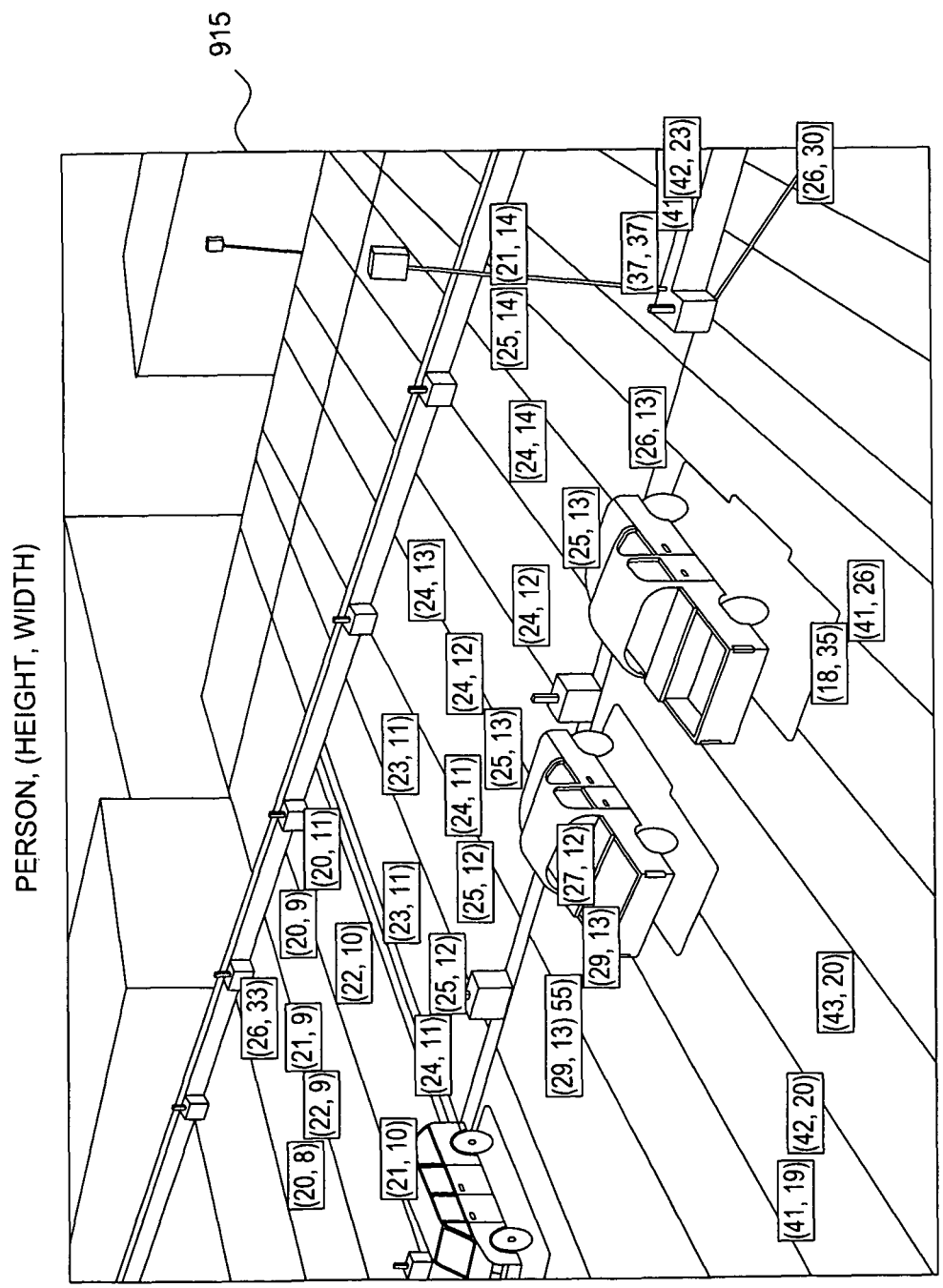

FIGS. 9A-9C illustrate examples of clusters generated by different ART networks superimposed over a video frame depicting a scene, according to one embodiment of the invention. FIG. 9A shows a video frame 905 with a set of nine different clusters superimposed over the frame image. Each cluster is labeled with a number representing the number of distinct inputs that were mapped to a given cluster. As can be seen from the general position of the clusters, objects tended to appear in this scene in two principal locations—one of the upper right third of the video frame 905 and the other in the middle third of the left side of the video frame 905. Using this information, should an object (whether classified as "person," "vehicle," "unknown," or "other") appear, e.g., in the middle of the frame, the alert analysis tool could recognize that this was an unusual event, and in response, generate an alert indicating that something unusual has occurred.

FIG. 9B shows a video frame 910 with a set of clusters superimposed over the frame image. In this example, each cluster corresponds to a position (X, Y) in the frame 910 where objects classified as "person" have been observed to appear in the scene. That is, each cluster represents a prototypical position for the position of a person in the scene and the bounds of each cluster may be determined relative to the prototypical position from the input values mapped to that cluster. Illustratively, each cluster is labeled with a number to represent the number of input instances that mapped to a respective cluster. In one embodiment, if an object classified as person were to appear outside of one the established clusters, then an alert may be generated. Further, the relative significance of each cluster may be tied to the number of input instances that mapped to a given cluster. For example, a cluster labeled "A" has only two instances—much lower than any of the other clusters. If the ART network which generated the clusters shown in FIG. 9B mapped an instance of input data to a cluster of low relative significance (e.g., the cluster labeled "A"), an alert may be generated to represent the occurrence of an event that, while not resulting in a new cluster being created for this ART network, was nevertheless unusual relative to what has been observed to have occurred in the scene depicted by frame 910. FIG. 9C also shows a video frame 915 depicting a scene. Specifically, FIG. 9C illustrates the clusters of FIG. 9B, but shows the height and width (in pixel) values of a person for each cluster.

Advantageously, embodiments of the invention may be used as part of a computer vision engine to identify unusual events as they are observed to occur in a sequence of video frames. Importantly, what is determined as unusual need not be defined in advance, but can be determined over time by observing a stream of primitive events and a stream of context events. In one embodiment, a mapper component is configured to parse the event streams and supply input data sets to multiple adaptive resonance theory (ART) networks. Each individual ART network may generate clusters from the set of inputs data supplied to that ART network. Each cluster represents an observed statistical distribution of a particular thing or event being observed that ART network. Further, the mapper component may be configured to detect unusual events occurring in the scene depicted by the video frames. For example, the mapper component may monitor the clusters that emerge a given one of the ART networks, and in some cases, when a set of inputs results in a new cluster (or a mapping to a cluster of low significance), generate an alert representing the occurrence of an unusual event.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a sequence of video frames depicting a scene captured by a video camera, the method comprising:
   receiving one or more data streams generated from the sequence of video frames, wherein a first one of the data streams provides a stream of context events generated by a computer vision engine, and wherein each context event provides kinematic data related to a foreground object observed by the computer vision engine in the sequence of video frames;
   parsing the data streams to identify data inputs matching an input layer of one of a plurality of adaptive resonance theory (ART) networks, wherein each ART network is configured to generate clusters from the data inputs matching the input layer of a respective ART network, and wherein each cluster provides a statistical distribution of a characteristic of the scene derived from the data streams that has been observed to occur at a location in the scene corresponding to a location of the cluster;
   passing the data inputs to the ART network with the matching input layer;
   updating the generated clusters in the ART network with the matching input layer; and
   evaluating the clusters of the ART network with the matching input layer to determine whether the data inputs passed to the ART network are indicative of an occurrence of a statistically relevant event, relative to the clusters in the ART network with the matching input layer; and
   upon determining that a first one of the clusters in a first one of the plurality of ART networks has not been updated for a specified period of time, removing the first cluster from the first ART network.

2. The computer-implemented method of claim 1, further comprising, in response to determining that the data inputs passed to the ART network are indicative of the occurrence of the statistically relevant event, publishing an alert message.

3. The computer-implemented method of claim 1 wherein the statistically relevant event is one of the creation of a new cluster in response to passing the data inputs to the ART network with the matching input layer and a mapping, by the ART network with the matching input layer, of the data inputs to a cluster of low significance, relative to other clusters in the ART network.

4. The computer-implemented method of claim 1, wherein one of the data streams is a stream of primitive events generated by a machine learning engine, and wherein each primitive event provides a semantic description of a group of one or more context events.

5. The computer-implemented method of claim 1, wherein one or more of the context events provide a classification of what is depicted by a foreground object detected in the scene by the computer vision engine.

6. The computer-implemented method of claim 5, wherein the classification classifies the detected foreground object as depicting one of a person, a vehicle, or an unknown, or an other class of foreground object.

7. The computer-implemented method of claim 1, wherein the kinematic data includes at least one of a coordinate position in a frame of video where the characteristic is observed to occur, and wherein the characteristic is one of an appearance of a foreground object, a disappearance of a foreground object, a height of a foreground object, a width of a foreground object, a velocity in a horizontal dimension of the foreground object, a velocity of a foreground object in a vertical dimension, a rate of acceleration of a foreground object in a horizontal dimension and a rate of acceleration of a foreground object in a vertical dimension.

8. The computer-implemented method of claim 1, further comprising, merging two or more overlapping clusters in the ART network with the matching input layer.

9. The computer-implemented method of claim 1, wherein updating the generated clusters in the ART network with the matching input layer comprises one of:
   (i) generating a new cluster at an initial position determined form the passed data inputs, wherein the new cluster includes an initial mean and a variance, and wherein the new cluster is bounded by a specified distance from the initial position for each dimension of data passed to the input layer;
   (ii) updating a previously generated cluster by updating the position, mean and variance of the previously generated cluster.

10. A non-transitory computer-readable medium containing a program which, when executed by a processor, performs an operation for analyzing a sequence of video frames depicting a scene captured by a video camera, the operation comprising:
   receiving one or more data streams generated from the sequence of video frames, wherein a first one of the data streams provides a stream of context events generated by a computer vision engine, and wherein each context event provides kinematic data related to a foreground object observed by the computer vision engine in the sequence of video frames;
   parsing the data streams to identify data inputs matching an input layer of one of a plurality of adaptive resonance theory (ART) networks, wherein each ART network is configured to generate clusters from the data inputs matching the input layer of a respective ART network, and wherein each cluster provides a statistical distribution of a characteristic of the scene derived from the data streams that has been observed to occur at a location in the scene corresponding to a location of the cluster;
   passing the data inputs to the ART network with the matching input layer;
   updating the generated clusters in the ART network with the matching input layer;
   evaluating the clusters of the ART network with the matching input layer to determine whether the data inputs passed to the ART network are indicative of an occurrence of a statistically relevant event, relative to the clusters in the ART network with the matching input layer; and
   upon determining that a first one of the clusters in a first one of the plurality of ART networks has not been updated for a specified period of time, removing the first cluster from the first ART network.

11. The non-transitory computer-readable medium of claim 10, wherein the operation further comprises, in response to determining that the data inputs passed to the ART network are indicative of the occurrence of the statistically relevant event, publishing an alert message.

12. The non-transitory computer-readable medium of claim 10, wherein the statistically relevant event is one of the creation of a new cluster in response to passing the data inputs to the ART network with the matching input layer and a mapping, by the ART network with the matching input layer, of the data inputs to a cluster of low significance, relative to other clusters in the ART network.

13. The non-transitory computer-readable medium of claim 10, wherein one of the data streams is a stream of primitive events generated by a machine learning engine, and wherein each primitive event provides a semantic description of a group of one or more context events.

14. The non-transitory computer-readable medium of claim 10, wherein one or more of the context events provide a classification of what is depicted by a foreground object detected in the scene by the computer vision engine.

15. The non-transitory computer-readable medium of claim 10, wherein the kinematic data includes at least one of a coordinate position in a frame of video where the characteristic is observed to occur, and wherein the characteristic is one of an appearance of a foreground object, a disappearance of a foreground object, a height of a foreground object, a width of a foreground object, a velocity in a horizontal dimension of the foreground object, a velocity of a foreground object in a vertical dimension, a rate of acceleration of a foreground object in a horizontal dimension and a rate of acceleration of a foreground object in a vertical dimension.

16. The non-transitory computer-readable medium of claim 10, wherein the operation further comprises, merging two or more overlapping clusters in the ART network with the matching input layer.

17. A system, comprising:
   a video input source configured to provide a sequence of video frames, each depicting a scene;
   a processor; and
   a memory containing a program, which, when executed on the processor is configured to perform an operation for analyzing the scene, as depicted by the sequence of video frames captured by the video input source, the operation comprising:
      receiving one or more data streams generated from the sequence of video frames, wherein a first one of the data streams provides a stream of context events generated by a computer vision engine, and wherein each context event provides kinematic data related to a foreground object observed by the computer vision engine in the sequence of video frames,
      parsing the data streams to identify data inputs matching an input layer of one of a plurality of adaptive resonance theory (ART) networks, wherein each ART network is configured to generate clusters from the data inputs matching the input layer of a respective ART network, and wherein each cluster provides a statistical distribution of a characteristic of the scene derived from the data streams that has been observed to occur at a location in the scene corresponding to a location of the cluster,
      passing the data inputs to the ART network with the matching input layer,
      updating the generated clusters in the ART network with the matching input layer,
      evaluating the clusters of the ART network with the matching input layer to determine whether the data inputs passed to the ART network are indicative of an occurrence of a statistically relevant event, relative to the clusters in the ART network with the matching input layer, and upon determining that a first one of the clusters in a first one of the plurality of ART networks has not been updated for a specified period of time, removing the first cluster from the first ART network.

18. The system of claim 17, wherein the operation further comprises, in response to determining that the data inputs passed to the ART network are indicative of the occurrence of the statistically relevant event, publishing an alert message.

19. The system of claim 17, wherein the statistically relevant event is one of the creation of a new cluster in response to passing the data inputs to the ART network with the matching input layer and a mapping, by the ART network with the matching input layer, of the data inputs to a cluster of low significance, relative to other clusters in the ART network.

20. The system of claim 17, wherein one of the data streams is a stream of primitive events generated by a machine learning engine, and wherein each primitive event provides a semantic description of a group of one or more context events.

21. The system of claim 17, wherein the kinematic data includes at least one of a coordinate position in a frame of video where the characteristic is observed to occur, and wherein the characteristic is one of an appearance of a foreground object, a disappearance of a foreground object, a height of a foreground object, a width of a foreground object, a velocity in a horizontal dimension of the foreground object, a velocity of a foreground object in a vertical dimension, a rate of acceleration of a foreground object in a horizontal dimension and a rate of acceleration of a foreground object in a vertical dimension.

\* \* \* \* \*